United States Patent
Böckmann et al.

(10) Patent No.: US 6,374,688 B1
(45) Date of Patent: Apr. 23, 2002

(54) METHOD OF CONTROLLING A TRANSMISSION

(75) Inventors: Gerhard Böckmann, Laatzen; Andreas Böhm, Wennigsen, both of (DE)

(73) Assignee: Wabco GmbH & Co. oHG, Hannover (DE)

(*) Notice: Subject to any disclaimer, the term of this patent is extended or adjusted under 35 U.S.C. 154(b) by 0 days.

(21) Appl. No.: 09/618,087

(22) Filed: Jul. 17, 2000

(30) Foreign Application Priority Data

Jul. 16, 1999 (DE) .......................................... 199 33 312

(51) Int. Cl.$^7$ ............................................. F16H 61/18
(52) U.S. Cl. ..................................................... 74/336 R
(58) Field of Search ...................................... 74/336 R

(56) References Cited

U.S. PATENT DOCUMENTS

| | | | |
|---|---|---|---|
| 4,852,006 A | 7/1989 | Speranza | |
| 5,587,905 A | * 12/1996 | Yessel et al. | 364/424.082 |
| 5,655,407 A | * 8/1997 | Dresden, III et al. | 74/336 R |
| 5,655,408 A | * 8/1997 | Sakakiyama et al. | 74/336 R |
| 5,680,307 A | * 10/1997 | Issa et al. | 364/424.081 |
| 5,738,607 A | * 4/1998 | Kondo et al. | 477/125 |
| 5,741,202 A | * 4/1998 | Huber | 477/124 |
| 5,819,585 A | * 10/1998 | Darnell | 74/335 |
| 5,943,912 A | * 8/1999 | Fowler et al. | 74/335 |
| 6,151,978 A | * 11/2000 | Huber | 74/336 R |

FOREIGN PATENT DOCUMENTS

| | | |
|---|---|---|
| DE | 692 07 131 T2 | 8/1996 |
| WO | WO 97/44210 | 11/1997 |

* cited by examiner

Primary Examiner—Dirk Wright
(74) Attorney, Agent, or Firm—Proskauer Rose LLP

(57) ABSTRACT

A method for controlling a transmission in a motor vehicle by operation of a transmission control system which evaluates the actuating wishes of the driver and by an electrical/pneumatic adjusting device, permits rapid shifting of gears in a non-synchronized transmission. In certain cases, for example when traveling uphill, the speed of the vehicle may decrease by the end of the gear changing process to such an extent that an engagement of the gear selected by the driver would lead to a drop below the engine idling speed. Similarly, the corollary applies to the highest acceptable engine speed, for example during down-hill travel. Therefore, the evolution in time of the actual transmission input speed or of the engine speed during a gear changing process is compared with the transmission input speed calculated on the basis of the gear ratio of the selected gear and the speed to be expected in case of synchronization of both speeds is calculated in advance. If the engine speed calculated in advance does not fall within the acceptable engine speed, another gear resulting in a rotational speed within the acceptable engine speed range is selected automatically.

7 Claims, 4 Drawing Sheets

METHOD OF CONTROLLING A TRANSMISSION

BACKGROUND OF THE INVENTION

The invention relates to a method of controlling a transmission, and more particularly a method of controlling a transmission applicable to practice in a vehicle including a service module actuatable by a driver of the vehicle to request a desired gear, and in which the service module is connected to a control system for the transmission which automatically switches gears as a result of an actuation of the service module.

A method of this type is disclosed, for example, in WO 97/44210.

The method described therein is used for the control of a manually operated, non-synchronized vehicle transmission of conventional design having a plurality of gears which are operated, in part, automatically, by means of an electronic control system for the transmission, hereinafter also referred to as a "transmission control system," and an electrical/pneumatic actuating device connected to same. The automation relates to the carrying out of the mechanical movements which are necessary to switch gears by the electrical/pneumatic actuating device as a result of triggering signals generated by the transmission control system.

In a transmission control system of this type, an operating unit or service module is provided, which is actuated by the driver for gear selection. The operating unit is not connected mechanically to the transmission as in conventional transmissions, but rather, transmits corresponding signals to the transmission control system when actuated.

The transmission is connected to the drive engine of the vehicle via a clutch which can be actuated by the driver, in such manner that it can be disconnected from the transmission. In accordance with the known method, the transmission control system produces an automated shifting of gears from the currently selected gear to the gear desired by the driver in response to an actuation, by the driver, of the operating unit. The transmission control system then transmits pertinent request signals to an engine control system, in addition to the triggering signals sent to the electrical/pneumatic actuating device. By these, the engine capacity is adapted in such manner that the transmission is temporarily left with zero force, so that the clutch need not be opened for a gear switching operation.

Due to the fact that a number of mechanical adjusting and positioning processes must be carried out in a gear shifting operation, such process lasts for a certain, non-negligible time. The traveling speed may decrease or increase during such time span, depending on whether the vehicle is on an even road, climbing a hill, or going down a hill. The possibility exists, therefore, that the gear selected and desired by the driver can no longer be entered because the engine rpm's at the vehicle speed at such later time would no longer be within an acceptable or desirable rpm range. In such case, the driver would have to initiate a gear shifting operation for a second time, resulting in further lengthening of the time required for the overall gear shifting process. Furthermore, as a result of such delay, the vehicle speed may also drop or increase in an undesirable manner.

Another method of controlling a transmission is disclosed, for example, in U.S. Pat. No. 4,852,906. The method described therein is limited to down-shifting, i.e., a shifting of gears for purposes of increasing the gear ratio of the transmission. Furthermore, in accordance with such disclosed method, it is not possible to change the gear ratio gear by gear. Instead, the gear with the highest gear ratio is always selected. This may result in violent, jolt-like reactions of the vehicle.

It is therefore an object of the present invention to provide a comfortable and universally applicable method of controlling a non-synchronized transmission which permits rapid shifting of gears.

SUMMARY OF THE INVENTION

In accordance with this and other objects of the invention, a method is provided for controlling a transmission of an engine-driven vehicle having several gears. The vehicle includes a service module actuatable by a driver of the vehicle to request a desired gear which is connected to a control system for the transmission. The control system for the transmission automatically switches gears as a result of an actuation of the service module. According to the method a transmission input speed and a transmission output speed is monitored, and based upon these speeds, continuous verification is made during a gear changing operation whether the engine speed will lie within an admissible rotational speed range of the engine as a result of engagement of the desired gear.

The invention provides the advantage that the time required for a shifting of gears is considerably shorter as compared with practice of previously known approaches. As a result, the driver will be given the impression that the transmission control system is carrying out the rapid gear shifting processes generally desired by drivers. It is a further advantage that the method in accordance with the invention can be carried out automatically in most of the numerous vehicle models and under the most diverse application conditions, such as, for example, mountain driving or different vehicle loads, without requiring additional measures or adjustments by the driver. As a result, the driver is relieved from having to evaluate the travel situation with respect to gear changes.

The above, and other objects, features and advantages of the present invention will become apparent from the following description read in conjunction with the accompanying drawings, in which like reference numerals designate the same elements and signals.

DETAILED DESCRIPTION OF THE PREFERRED EMBODIMENT

Figure 1:
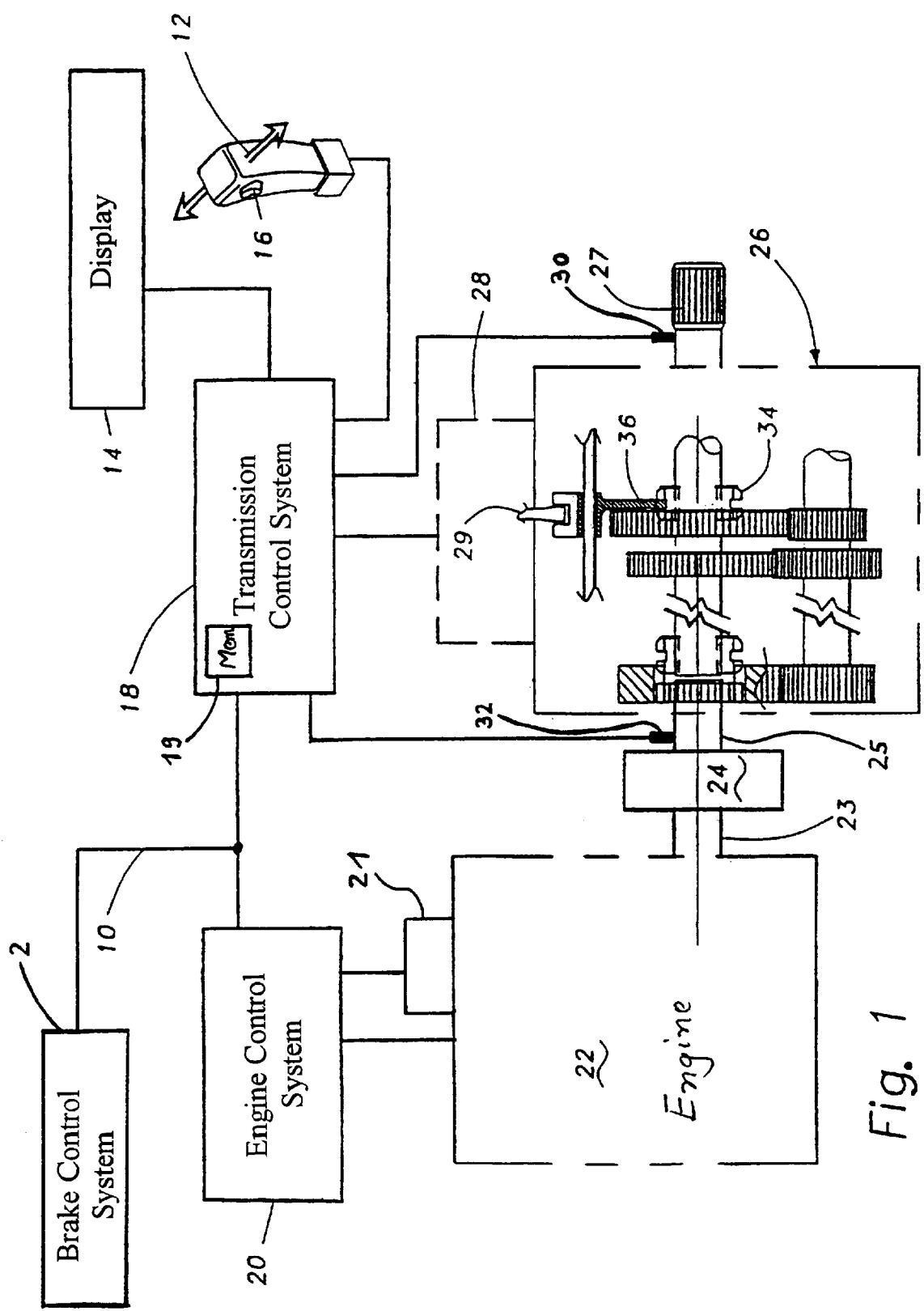
FIG. 1 is a schematic representation of a device for carrying out the method in accordance with the invention.

Referring now to the figures, and in particular FIG. 1, an engine 22 is depicted which serves to drive the vehicle, and in which the depicted device for carrying out the method in accordance with the invention is installed. The engine 22 transmits driving force in the form of a rotational movement, via an engine driving shaft 23, to a clutch 24 of known design. The clutch 24 can be moved into an open and a closed state by the driver of the vehicle by means of a pedal (not shown). The clutch 24 is normally closed without actuation of the pedal, while being opened as the pedal is actuated. In its closed state, the clutch 24 transmits the rotational movement of the engine driving shaft 23 to a transmission driving shaft 25.

The transmission 26 serves to transmit the rotational movement of the transmission driving shaft 25 to a transmission driving shaft 27 with an adjustable gear ratio. The transmission driving shaft 27 is connected to the drive wheels of the vehicle via additonal parts, such as, for example, an additonal shaft, a Cardan joint, a different gear, etc.

The transmission 26 is provided with a plurality of gears which can be alternately brought into engagement with each other for the selection of a desired gear ratio. Mechanical transmission elements 34, 36 are provided, by means of which the gears can be engaged or disengaged in order to selected the gear ratio. The mechanical transmission elements 34, 36 are moved by an electrically controlled transmission actuator 28 which utilizes a gear shifting finger 29. The transmission actuator 28 may be provided with servo-devices equipped with electrical motors. In a preferred embodiment of the invention, the transmission actuator has pressure-medium-actuated actuating cylinders which can be subjected, via solenoid valves, to changing pressure from a pressure medium source, for example, a compressed-air reservoir.

The transmission actuator 29 is connected to a transmission control system 18 via electrical cables for control of the transmission functions. The transmission control system 18 is in turn connected to rotational speed sensors 30, 32 which transmit information to the transmission control system 18, regarding the transmission output speed, i.e., the rotational speed of the transmission driving shaft 27, and the transmission input speed, i.e., the rotational speed of the transmission driving shaft 25, respectively.

Furthermore, the transmission control system 18 is connected to a service module 12, 16 which is equipped with a service lever 12 and a neutral switch 16, which, as shown, is advantageously located on the service lever 12. The driver of the vehicle is able to inform the transmission control system 18 which gear should be selected by means of the service module 12, 16. In a preferred embodiment of the invention, the transmission 26 is shifted up by one gear by moving the service lever 12 forward, while it is switched down by one gear by a backward movement. Actuation of the neutral switch switches the transmission 26 into the neutral position, i.e., no gear is selected.

The transmission control system 18 is connected to additional control systems present in the vehicle, for example, an engine control system 20 and a brake system 2, via a data bus system 10 for the exchange of data. The transmission control system 18 is capable of informing the engine control system 20, through suitable data messages, for example, that a certain engine speed must be set for a gear change, or that an engine brake 21 must be actuated. The transmission control system 18 can obtain information from the brake system 2 which pertains to certain vehicle data such as, for example, vehicle mass, through other data messages.

The transmission control system 18 is also connected to a display arrangement 14, preferably located within the driver's field of vision, on which certain information can be indicated, for example, the gear selected by the driver by means of the service module 12, 16, or the gear to be selected or already being currently used. Furthermore, a non-volatile memory 19 is located in the transmission control system 18.

The engine is further connected to the engine control system 20 which is used for the control of the engine functions, for example, speed control, regulation of the fuel supply, regulation of pollutant emissions, and switching of the engine brake 21 on and off.

The transmission control system 18, the engine control system 20, and the brake system 2, are advantageously provided as electronic control devices. Furthermore, they may also be provided as a single control device.

Figure 2:
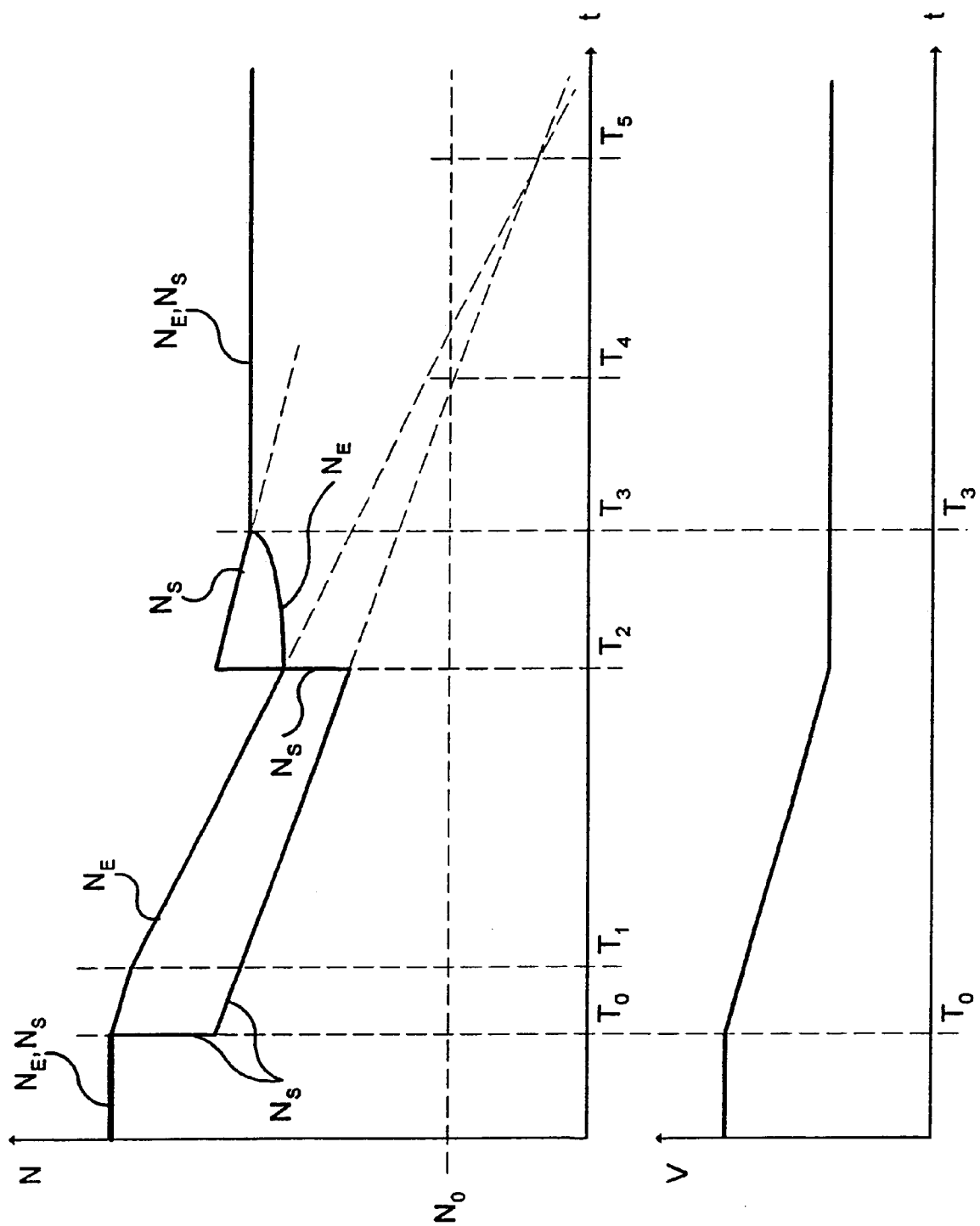
FIG. 2 is a graphical representation in the form of a time chart plotting the course of an exemplary embodiment of the method according to the invention relative to time.

Turning now to FIG. 2, a plot of the rotational speeds N and the vehicle speed V over time are depicted, each in its own diagram. In the rotational speed diagram (top graph), the speed of the transmission input $N_E$, which is that of the engine speed when the clutch is engaged, and a so-called synchronous rotational speed $N_S$, are recorded. The synchronous rotational speed is calculated as a product of the speed of the transmission output $N_A$ multiplied by the gear ratio G of the selected or desired gear, as appears from the following equation:

$$N_S = N_A * G \qquad [1]$$

The transmission output speed $N_A$ can also be determined from the vehicle speed V if the gear ratios of the drive differential are known. It is thereby possible to dispense with a rotational speed sensor on the transmission output when information on the vehicle speed is available.

While the clutch is engaged and the gear is selected, the synchronous rotational speed $N_S$ is always that of the engine speed and of the transmission input $N_E$.

As soon as the transmission is shifted into neutral position, i.e., when no gear is selected, the synchronous rotational speed is determined in the transmission control system 18 on the basis of the particular gear ratio G which will apply as a result of the gear desired by the driver when such gear has been selected.

In FIG. 2, continuous lines indicate the course of a gear changing event applying the method in accordance with invention, and broken lines show the theoretical course without application of the invention. The broken line marked $N_0$ represents the idling speed of the engine, below which the speed may not fall.

In the period before the point in time $T_0$, the vehicle is in a travel state with a steady travel speed, whereby the engine rpm's are relatively high. The clutch 24 is closed in this case, and a gear is engaged. At the point in time $T_0$, the transmission control system 18 emits a command which it receives by means of the service module 12 to shift gears, indicating selection of a gear with a higher gear ratio.

From the point in time $T_0$ on, the transmission is in a neutral position, and the vehicle is no longer subjected to any driving moment. Consequently, the vehicle speed V drops, for example, due to travel on an inclined road surface. By analogy to the vehicle speed V, the synchronous rotational speed $N_S$ calculated for the transmission control system 18 also drops.

Since the clutch 24 is closed, the rotational speed of the transmission input $N_E$ decreases in the same manner as the engine speed with an engine-specific speed gradient. By actuating the engine brake 21 at point in time $T_0$, a switch is made at point in time $T_1$ from a first engine-specific rotational speed gradient to a second, higher engine-specific rotational speed gradient after the passage of a delay period specific to the engine brake and, thereby, a synchronization between the rotational speeds $N_E$, $N_S$ is accelerated. The engine brake 21 begins to take effect starting at point in time $T_1$, i.e., the first rotational speed gradient is in effect between the point in time $T_0$ and the point in time $T_1$, and the second rotational speed gradient is in effect starting at point in time $T_1$.

The gear desired by the driver can only be selected when a synchronization between the rotational speeds $N_E$, $N_S$ has been reached. The transmission control system 18 continuously determines the engine speed or rotational speed of the transmission input $N_E$ while evaluating the evolution of the rotational speeds $N_E$, $N_S$. An expected rotational speed of the transmission input $N_{EW}$ is advantageously calculated by the following equation:

$$N_{EW}=N_E-\dot{N}_E \cdot (N_E-N_S)/(\dot{N}_E-\dot{N}_S) \qquad [2]$$

The magnitudes $\dot{N}_E$ or $\dot{N}_S$ represent the time based derivatives of the rotational speeds $N_E$ or $N_S$, respectively.

The transmission control system 18 then checks continuously whether the expected rotational speed of the transmission input $N_{EW}$ does not drop below the engine idling speed $N_0$. When such event does occur, the transmission control system 18 automatically changes the gear desired by the driver to the gear next to the desired gear which has a greater gear ratio than the desired gear. This is shown in FIG. 2 at the point in time $T_2$. By using a gear with a greater gear ratio than the gear ratio of the desired gear, the synchronous rotational speed $N_S$ calculated in the transmission control system 18 suddenly becomes greater and exceeds the transmission input speed $N_E$ in the embodiment shown in FIG. 2.

In order to bring about rapid synchronization of the rotational speeds, the transmission control system 18, by sending corresponding data messages to the engine control system 20, increases the engine speed until the synchronization of the rotational speeds $N_E$, $N_S$ takes place. The synchronization takes place in the embodiment in FIG. 2 at the point in time $T_3$. At this point in time, the transmission control system 18 selects the previously found gear through appropriate triggering of the transmission actuator 28. Starting at point in time $T_3$, driving capacity is again available to the vehicle.

The point in time when the synchronous rotational speed $N_S$ would have reached the engine idling speed $N_0$ if the gear desired by the driver had been maintained is represented by the point in time $T_4$ in FIG. 2. A synchronization of the rotational speeds $N_E$, $N_S$ would then have occurred only at the point in time $T_5$. As is apparent from FIG. 2, the synchronization could not have occurred because the rotational speeds $N_E$, $N_S$, and hence the engine speed, will have already dropped below the engine idling speed $N_0$.

Figure 3:
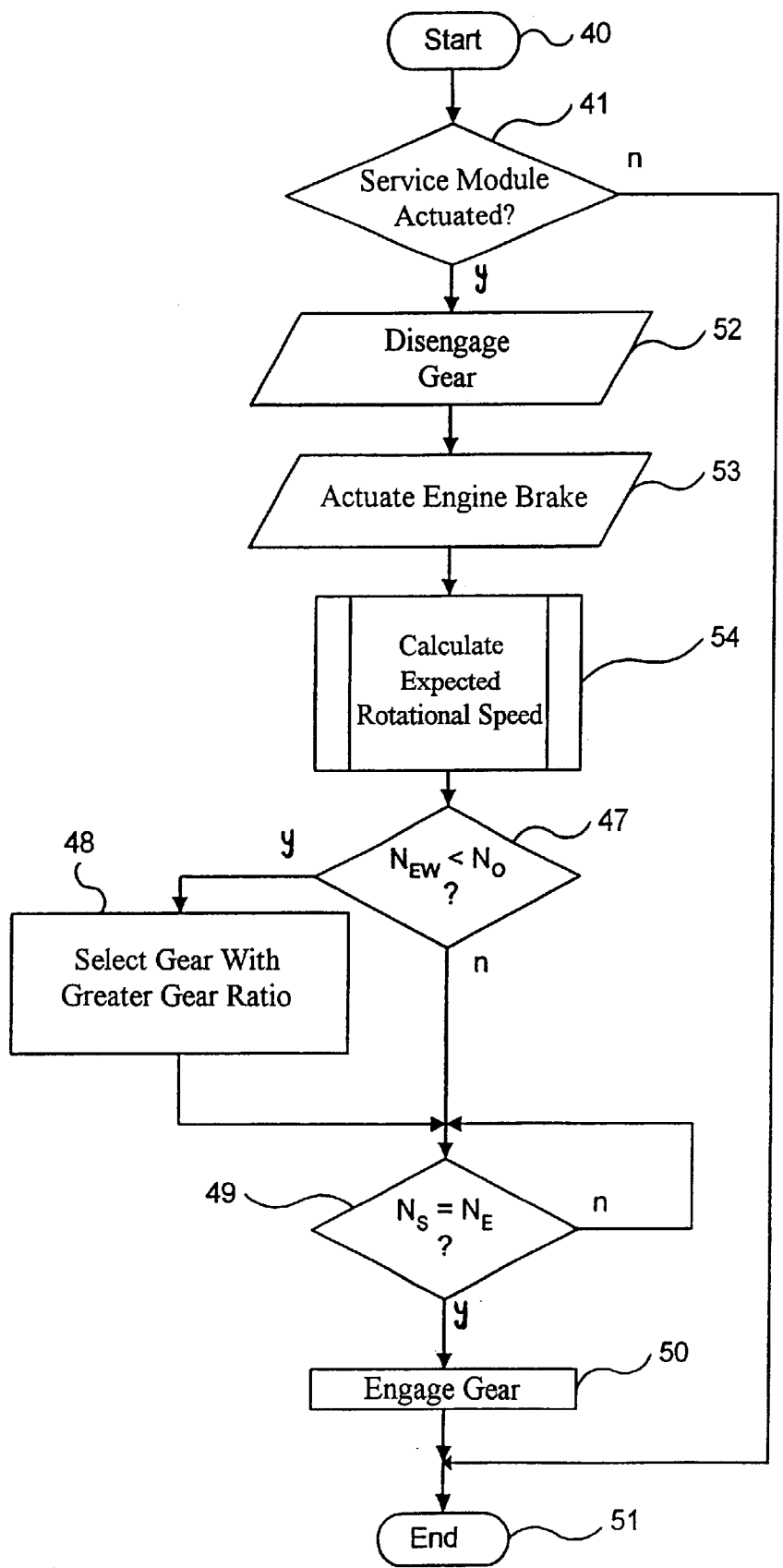
FIG. 3 is a flow chart representing the course of the exemplary embodiment according to FIG. 2.

FIG. 3 shows the previously explained evolution in the form of a flow chart. The method depicted thereby starts with a block 40. In the next block, a decision block 41, the program checks whether the service module 12, 16 has been actuated for a gear shift. If this is not the case, the method ends with block 51.

Otherwise, the program continues with a data transfer block 52 in which a signal is transmitted to the transmission actuator 28, following which, the currently engaged gear is disengaged. This takes place at point in time $T_0$ according to FIG. 2. In a subsequent data transfer block 53 the data message is transmitted to the engine control system 20, by means of which the engine brake 21 is actuated. The effect of the engine brake 21 then begins, as mentioned earlier, at point in time $T_1$.

Following this, a sub-program block 54 in which the characteristic rotational speeds are stipulated is called up. The sub-program block 54 is shown in further detail in FIG. 4.

Figure 4:
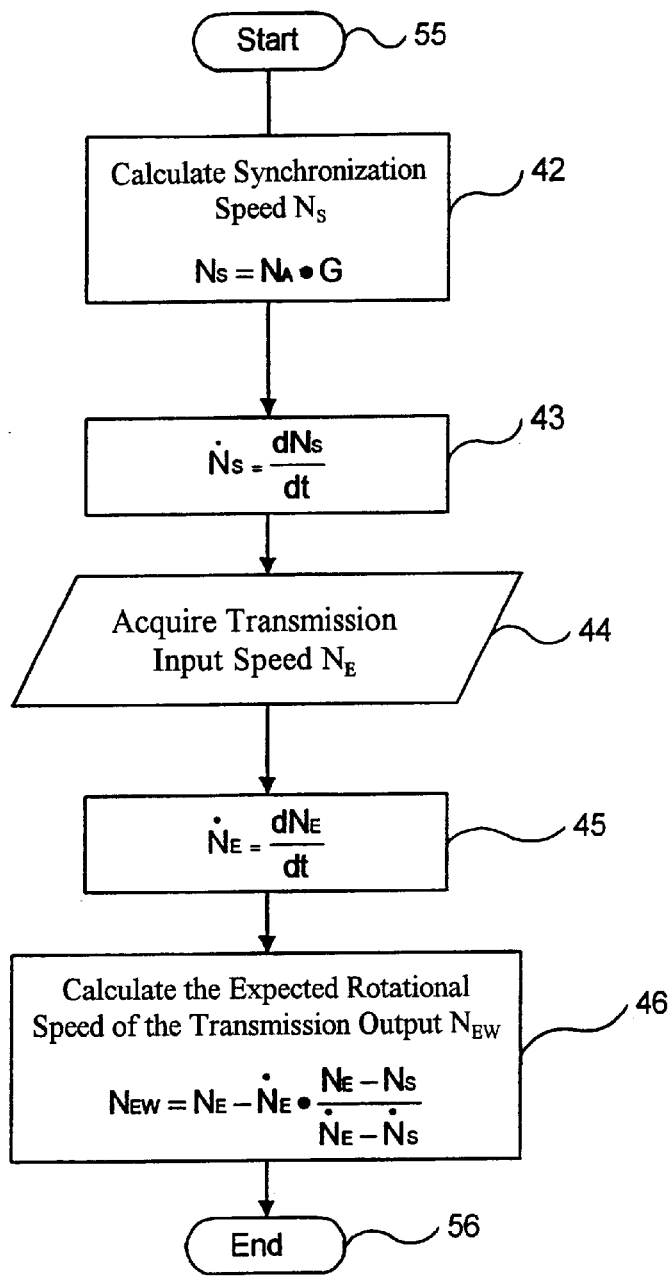
FIG. 4 is another flow chart further representing the course of the exemplary embodiment according to FIG. 2.

Referring to FIG. 4, the sub-program block 54 starts with block 55. The program then continues with an I/O block 42 in which the synchronous rotational speed $N_S$ is calculated in accordance with equation [1]. The time derivative $\dot{N}_S$ of the synchronous rotational speed $N_S$ is then calculated in an I/O block 43. The time derivative $\dot{N}_S$ represents the slope of the line $N_S$ in FIG. 2, starting at point in time $T_0$.

Following this, the transmission input speed $N_E$ is acquired in a data transfer block 44, for example, through the evaluation of the signal of the rotational-speed sensor 32 or through reception of a rotational speed information from the engine control system 20 via the data bus system 10. The time derivative $\dot{N}_E$ of the transmission input speed $N_E$ is then calculated in a decision block 45. The time derivative $\dot{N}_E$ represents the slope of the line $N_E$ in FIG. 2, starting at point in time $T_0$. Alternatively, a predetermined value stored in the transmission control system 18, for example, in the storage 19, which is a measure for the median delay of the transmission input speed $N_E$ with a disengaged gear, can be used instead of the determination of the time derivative.

Using the equation [2], the expected rotational speed of the transmission input $N_{EW}$ at the moment of synchronization of the rotational speeds $N_E$, $N_S$ is then calculated in a decision block 46. The sub-program block 54 then ends with block 56.

The program is then continued with a decision block 47 shown in FIG. 3. A verification is made in the decision block 47 whether the expected rotational speed $N_{EW}$ is lower than the engine idling speed $N_0$. If this is the case, the program branches off to a block 48 in which a gear with a greater gear ratio than the gear requested by the driver is selected automatically.

A verification is then made continuously in a decision block 49 whether a synchronization of the rotational speeds $N_E$, $N_S$ has taken place. If necessary, the engine speed can be increased in accordance with this method, as already described in connection with FIG. 2, in order to bring about synchronization. When the synchronization has taken place, the selected gear is engaged in a block 50 by transmitting corresponding signals to the transmission actuator 29.

The method then ends with block 51.

By analogy to the example of the embodiment of the invention as described above, an additional embodiment of the invention is described, which is to be used advantageously, in particular, with vehicles that accelerate during the gear changing process, for example, in downhill travel. In this example, the rotational speed of the transmission input $N_{EW}$ to be expected is calculated and is compared with the highest admissible engine speed, in a manner analogous to the embodiment described with reference to FIGS. 2 and 3. If the expected rotational speed $N_{EW}$ exceeds the highest admissible engine speed, a gear with a lower gear ratio is selected automatically.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of controlling a transmission of an engine-driven vehicle having several gears, the vehicle including a service module actuatable by a driver of the vehicle to request a desired gear, the service module being connected to a system for the transmission which automatically switches gears as a result of an actuation of the service module, the method comprising:

monitoring a transmission input speed and a transmission output speed;

continuously verifying during a gear changing process whether a transmission input speed to be expected at the point of time of completion of the gear changing process, which is determined based at least in part upon the current transmission input speed and the current transmission output speed, lies within an admissible rotational speed range;

automatically engaging the gear desired by the driver when the transmission input speed to be expected lies within the admissible rotational speed range; and automatically selecting and engaging a different gear from the gear desired by the driver when the transmission input speed to be expected lies outside the admissible rotational speed range, said different gear being a gear at which the transmission input speed to be expected lies within the admissible rotational speed range.

2. A method according to claim 1, wherein said step of continuously verifying includes taking into consideration the engine idling speed when the desired gear selected has a greater gear ratio than a present gear.

3. A method according to claim 1, wherein said different gear is the gear nearest to the desired gear selected by means of the service module for which the transmission input speed to be expected is within the admissible rotational speed range.

4. A method according to claim 1, further comprising actuating an engine brake to assist in reducing the engine speed.

5. A method according to claim 1, further comprising storing information on the engine specific change gradient in the transmission control system.

6. A method according to claim 1, further comprising storing information on an evolution of the engine speed relative to time in the transmission control system.

7. A method according to claim 1, further comprising calculating the transmission input speed to be expected at the time of completion of the gear changing process based upon the current transmission input speed, the current transmission output speed, and their time derivatives.

* * * * *